(12) United States Patent
Huels et al.

(10) Patent No.: US 10,746,256 B2
(45) Date of Patent: Aug. 18, 2020

(54) BELT OR BELT SEGMENT

(71) Applicant: ContiTech Transportbandsysteme GmbH, Hannover (DE)

(72) Inventors: Achim Huels, Barsinghausen (DE); Michael Moeschen-Siekmann, Noerten-Hardenberg (DE); Carsten Behrens, Bilshausen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 366 days.

(21) Appl. No.: 15/864,903

(22) Filed: Jan. 8, 2018

(65) Prior Publication Data
US 2018/0128348 A1 May 10, 2018

Related U.S. Application Data

(63) Continuation of application No. PCT/EP2016/059024, filed on Apr. 22, 2016.

(30) Foreign Application Priority Data

Jul. 8, 2015 (DE) .................. 10 2015 212 748

(51) Int. Cl.
*F16G 3/04* (2006.01)
*F16G 11/04* (2006.01)
(Continued)

(52) U.S. Cl.
CPC .............. *F16G 3/04* (2013.01); *F16G 3/00* (2013.01); *F16G 3/003* (2013.01); *F16G 3/02* (2013.01); *F16G 11/04* (2013.01)

(58) Field of Classification Search
CPC ..... F16G 3/02; F16G 3/00; F16G 3/04; Y10T 24/1632; Y10T 24/1636
(Continued)

(56) References Cited

U.S. PATENT DOCUMENTS 224,951 A * 2/1880 Redsecker ............... F16G 3/00 24/32
733,393 A * 7/1903 Heron .................... F16G 3/00 474/253

(Continued)

FOREIGN PATENT DOCUMENTS

DE 1101062 B 3/1961
DE 1166564 B 3/1964
(Continued)

OTHER PUBLICATIONS

International Search Report dated Jun. 23, 2016 of international application PCT/EP2016/059024 on which this application is based.

*Primary Examiner* — Henry Y Liu
(74) *Attorney, Agent, or Firm* — Gregory Adams; David L. Cate

(57) ABSTRACT

The present invention relates to a belt or a belt segment having a plurality of strength supports. The strength supports run in the longitudinal direction (X) and are disposed so as to be mutually parallel. A connection element which forms one end of the belt or the belt segment and is configured for connecting to a further connection element of the other end of the belt or to one end of a further belt segment, it being possible for the ends of the strength supports to be held in a force-fitting manner by the connection element by way of press-fitting. The belt or the belt segment includes a part-region of the connection element which is configured as a tool region, in order to serve as a tool part during press-fitting of the ends of the strength supports in the connection element.

16 Claims, 8 Drawing Sheets

(51) Int. Cl.
*F16G 3/02* (2006.01)
*F16G 3/00* (2006.01)

(58) Field of Classification Search
USPC .......................................... 474/253, 255–258
See application file for complete search history.

(56) References Cited

U.S. PATENT DOCUMENTS

| | | | | |
|---|---|---|---|---|
| 923,546 A * | 6/1909 | Maxwell | ............... | F16G 3/02 24/33 B |
| 1,426,796 A * | 8/1922 | Walker | ............... | F16G 3/02 474/255 |
| 1,427,856 A * | 9/1922 | Rutz | ............... | F16G 1/26 474/247 |
| 1,614,751 A * | 1/1927 | Mitchell | ............... | F16G 11/08 24/33 R |
| 1,653,624 A * | 12/1927 | Gingras | ............... | F16G 3/02 24/33 B |
| 2,158,007 A * | 5/1939 | Ellis | ............... | D06F 83/00 24/33 C |
| 2,178,558 A * | 11/1939 | Cady | ............... | F16G 7/00 474/257 |
| 2,179,655 A * | 11/1939 | Cutler | ............... | F16G 1/04 474/90 |
| 2,224,532 A * | 12/1940 | Ziller | ............... | F16G 3/02 24/33 B |
| 2,362,949 A * | 11/1944 | Tingley | ............... | F16G 7/00 24/33 B |
| 2,446,311 A * | 8/1948 | Traxler | ............... | F16G 7/00 474/257 |
| 2,468,898 A * | 5/1949 | Shingle | ............... | F16G 1/02 474/255 |
| 2,496,695 A * | 2/1950 | Brunner | ............... | F16G 7/00 24/31 W |
| 2,566,262 A | 8/1951 | Traxler | | |
| 2,727,399 A * | 12/1955 | Hjort | ............... | F16G 1/04 474/255 |
| 2,814,845 A * | 12/1957 | Hjort | ............... | F16G 3/00 24/33 K |
| 2,847,864 A * | 8/1958 | Waugh | ............... | F16G 7/00 474/257 |
| 3,105,390 A * | 10/1963 | Wiese | ............... | B65G 15/42 474/205 |
| 3,316,599 A * | 5/1967 | Wagner | ............... | D21F 7/10 24/31 H |
| 3,327,359 A * | 6/1967 | Wiese | ............... | F16G 11/00 24/37 |
| 3,438,096 A * | 4/1969 | McComb | ............... | F16G 3/04 24/33 B |
| 3,581,348 A * | 6/1971 | Lister | ............... | F16G 3/04 24/31 H |
| 3,664,490 A * | 5/1972 | Maruyama | ............. | B65G 17/02 198/847 |
| 3,735,451 A * | 5/1973 | Haythornthwaite | ...... | F16G 3/04 24/33 C |
| 3,762,232 A * | 10/1973 | Muller | ............... | F16G 3/00 74/89.22 |
| 3,810,278 A | 5/1974 | Kenney | | |
| 3,962,754 A * | 6/1976 | Stolz | ............... | F16G 3/04 24/33 B |
| 4,023,239 A * | 5/1977 | Stolz | ............... | F16G 3/02 24/33 P |
| 4,298,343 A * | 11/1981 | Redmond, Jr. | ........ | B29D 29/08 24/38 |
| 4,344,209 A * | 8/1982 | Harwood | ............... | F16G 3/02 139/383 A |
| 4,364,421 A * | 12/1982 | Martin | ............... | D03D 3/04 139/383 AA |
| 4,582,505 A * | 4/1986 | Stolz | ............... | F16G 3/04 24/33 P |
| 4,650,446 A * | 3/1987 | Pinto | ............... | F16G 3/00 474/253 |
| 4,653,156 A * | 3/1987 | Stolz | ............... | F16G 3/04 24/31 B |
| 4,671,403 A * | 6/1987 | Schick | ............... | F16G 3/02 198/844.2 |
| 4,721,497 A * | 1/1988 | Jager | ............... | B62D 55/213 24/37 |
| 4,781,666 A * | 11/1988 | Acee, Sr. | ............... | F16G 3/00 24/16 PB |
| 4,846,770 A * | 7/1989 | Lane | ............... | F16G 3/00 474/253 |
| 4,911,683 A * | 3/1990 | Legge | ............... | F16G 3/02 428/223 |
| 4,912,812 A * | 4/1990 | Henn | ............... | F16G 3/00 24/31 R |
| 4,944,716 A * | 7/1990 | Graff | ............... | F16G 3/02 474/255 |
| 5,015,220 A * | 5/1991 | Legge | ............... | D21F 1/0054 474/253 |
| 5,020,658 A * | 6/1991 | Jager | ............... | A01D 17/10 198/844.2 |
| 5,048,675 A * | 9/1991 | Nadalutti | ............... | F16G 3/04 198/844.2 |
| 5,092,823 A * | 3/1992 | Longo | ............... | F16G 1/00 474/253 |
| 5,095,590 A * | 3/1992 | Schick | ............... | F16G 3/04 198/844.2 |
| 5,099,548 A * | 3/1992 | Loosli | ............... | B65G 15/52 198/844.2 |
| 5,308,292 A * | 5/1994 | Mistry | ............... | F16G 1/00 474/207 |
| 5,327,823 A * | 7/1994 | Clevenger, Jr. | ......... | A01F 15/18 100/88 |
| 5,348,143 A * | 9/1994 | Musil | ............... | B65G 15/30 198/844.2 |
| 5,419,744 A * | 5/1995 | Kagebeck | ............... | F16B 2/08 474/253 |
| 5,632,701 A * | 5/1997 | Neel | ............... | B65G 17/08 24/33 B |
| 6,053,308 A * | 4/2000 | Vogrig | ............... | F16G 3/02 198/844.2 |
| 6,374,462 B1 * | 4/2002 | Jakob | ............... | F16G 3/04 24/33 B |
| 6,488,144 B2 * | 12/2002 | Winkelman | ............ | F16B 19/06 198/844.2 |
| 6,689,247 B1 * | 2/2004 | Steven | ............... | F16G 3/10 156/137 |
| 6,896,125 B2 * | 5/2005 | Webster | ............... | B65G 15/52 198/844.2 |
| 7,261,929 B2 * | 8/2007 | Allen | ............... | B29C 66/1142 198/844.2 |
| 7,762,390 B2 * | 7/2010 | Suelzle | ............... | F16G 3/16 198/844.2 |
| 8,684,170 B2 * | 4/2014 | Jakob | ............... | F16G 3/04 198/844.2 |
| 8,770,394 B2 * | 7/2014 | Huels | ............... | F16G 3/02 198/844.2 |
| 9,200,696 B2 * | 12/2015 | Jakob | ............... | F16G 3/00 |
| 9,447,843 B2 | 9/2016 | Moeschen-Siekmann et al. | | |
| 9,506,526 B2 * | 11/2016 | Moeschen-Siekmann | .................. | F16G 3/02 |
| 2003/0146072 A1 * | 8/2003 | Rubino | ............... | F16G 3/02 198/844.2 |
| 2012/0205223 A1 * | 8/2012 | Moeschen-Siekmann | .................. | F16G 3/09 198/844.2 |
| 2015/0075951 A1 * | 3/2015 | Moeschen-Siekmann | .................. | F16G 3/02 198/844.2 |

FOREIGN PATENT DOCUMENTS

| | | |
|---|---|---|
| DE | 6928907 U | 11/1969 |
| DE | 2218136 A1 | 10/1972 |
| DE | 3227729 A1 | 1/1984 |
| DE | 3736484 A1 | 5/1989 |

(56) References Cited

FOREIGN PATENT DOCUMENTS

| | | |
|---|---|---|
| DE | 9201292 U1 | 3/1992 |
| GB | 972856 A | 10/1964 |
| WO | 2013068170 A1 | 5/2013 |

* cited by examiner

BELT OR BELT SEGMENT

CROSS REFERENCE TO RELATED APPLICATIONS

This application is a continuation application of international patent application PCT/EP2016/059024, filed Apr. 22, 2016 designating the United States and claiming priority from German application 10 2015 212 748.6, filed Jul. 8, 2015, and the entire content of both applications is incorporated herein by reference.

BACKGROUND OF THE INVENTION

Belts closed in an endless manner represent annular elements which can be used for example as drive belts such as, for example, V-belts, for the transmission of power. However, the belts can also be used as conveyor belts for transporting for example loose bulk materials. The belts can also be used in order to serve as track belts for propelling the vehicle in the case of tracked vehicles.

Belts of this type in general run around a drive and further guide or support rollers, respectively, in order for the drive output to be transmitted to an output element (V-belt) in order for the drive output to be utilized for transporting material (conveyor belt) or for propelling a vehicle (track belt). To this end, the belts have a predetermined elasticity, on the one hand, which can be achieved for example by the use of an elastomeric material such as, for example, rubber, as the base material of the belt. On the other hand, these belts usually in the longitudinal direction have one or a plurality of strength supports in order for the tensile forces to be transmitted in the running direction of the belt. The strength supports can be, for example, steel cables which permit a particularly high force to be transmitted, but textile fabrics as strength supports are also typical.

Belts of this type, for example as V-belts, can to some extent be produced in an already closed manner. In most cases, for example as conveyor belts or track belts, the belts by virtue of the length thereof in the longitudinal direction are produced so as to be typically open, that is, produced as an elongate body, and are also transported in this state to the application site. There, the belts there are then closed in an endless manner. Herein, a belt by way of the two ends thereof can be closed in an inherently endless manner, or at least two belt segments can be disposed in sequence and be conjointly closed in an endless manner to form one belt. Closing in an endless manner can be performed by joining the two ends by vulcanization, for example, this however precluding a non-destructive separation of the ends and thus opening of the belt, for instance in the case of wear or damage. Furthermore, to this end a high level of complexity is required at the application site.

Therefore, it is known for the ends of the strength supports to be left free from the elastomeric material or exposed, respectively, at both ends of the open belt, and for these ends to be connected in a mechanical manner. This can be performed, for example, in that the respective ends are jammed in a respective common coupling element, and the two coupling elements are interconnected, for example in the manner of a hinge, by means of a coupling bar. By distributing this mechanical clamping connection across two coupling elements which are then mutually rotatable as an articulation, the flexure of the belt overall is to be restricted as little as possible. This can be required in particular in the case of tight deflection radii.

U.S. Pat. No. 8,770,394 B2 and U.S. Pat. No. 9,506,526 B2 show a belt from an elastomeric material having a strength support tier from steel cables which run in the longitudinal direction of the belt and are disposed so as to be mutually parallel. The ends of the steel cables are in each case jammed in a force-fitting manner by press-fitting into a connection element in the form of a belt-end body. The two connection elements have in each case castellated projections that are directed toward one another and are laterally mutually overlapping which are provided with transverse bores. A coupling bar in relation to which the two belt-end bodies can rotate in relation to one another can be passed through the transverse bores. On account thereof, the belt is closed in an endless manner and the two belt ends are intercoupled in the manner of a hinge.

It is disadvantageous herein that the tools by way of which the press-fitting of the ends of the steel cables is carried out in the belt-end bodies can wear. This can arise in particular because very high pressing forces can be required in order for the ends of the steel cables to be press-fitted in the belt-end body. The wear of the tools can influence the quality of the press-fit connection and thus lead to a reduced durability of the press-fit connection. This can reduce the maximum permissible tensile forces of the belt and reduce the service life of the latter.

SUMMARY OF THE INVENTION

It is an object of the present invention to provide a belt or a belt segment of the type described at the outset which in relation to known solutions has an increased service life. In particular, the wear of the pressing tools which are used for press-fitting the ends of the strength supports in the connection element is to be reduced or avoided respectively.

The object is achieved according to the invention by a belt or a belt segment having: a plurality of strength supports each having a strength support end; the belt or belt segment defining, a first belt end, a second belt end, and a longitudinal direction (X); the plurality of strength supports running in the longitudinal direction (X) and being arranged so as to be mutually parallel; a connection element which forms the first belt end of the belt or of the belt segment and is configured for connecting to a further connection element of the second belt end or to an end of a further belt segment; the connection element being configured to hold the strength support ends of the strength supports in a force-fitting manner by way of press-fitting; and, the connection element including a part-region configured as a tool region so as to serve as a tool part during a press-fitting of the strength support ends of the strength supports in the connection element.

The present invention thus relates to a belt or a belt segment having a plurality of strength supports which run in the longitudinal direction and are disposed so as to be mutually parallel. The strength supports are preferably steel cables which can transmit high tensile forces. The longitudinal direction is to be understood to be the direction in which the belt or the belt segment, respectively, is closed in an endless manner, or can be closed in an endless manner, respectively. The transverse direction, which can also be referred to as the width, and the height or thickness, respectively, of the belt or the belt segment, respectively, extends perpendicularly to the longitudinal direction. A belt can be closed in an endless manner by connecting the two ends of the belt, or a plurality of belt segments can be closed in an endless manner to form one belt by connecting the ends of the belt segments.

The belt or the belt segment furthermore has a connection element which forms one end of the belt or of the belt segment, respectively, and is configured for connecting to a further connection element of the other end of the belt, or to one end of a further belt segment, respectively. The ends of the strength supports can be held in a force-fitting manner by the connection element by way of press-fitting. The connection element is preferably configured in the manner of a hinge such that the connection element conjointly with a respective second connection element of the other end of the belt or of an end of a further belt segment, respectively, can form a rotatable articulation. It can be enabled on account thereof that this coupling region can better adapt to a deflection of the closed belt, for example about a drum.

This coupling between the connecting elements is preferably implemented by a coupling bar which is passed through the bores of the castellated projections of the connection elements in the transverse direction and is secured therein. On account thereof, this connection can also be configured to be releasable.

The belt or the belt segment is characterized in that a part-region of the connection element is configured as a tool region, in order to serve as a tool part during press-fitting of the ends of the strength supports in the connection element. In other words, the pressing tool is configured so as to be integrated in the connection element. In this way, wear of the pressing tool can be reduced or be completely avoided, respectively, at least on one side of the tool because the contour of this tool side that can be subject to wear is configured so as to be integrated as a workpiece in the connection element. That side of the tool of which the contour is integrated in the connection element can thus be configured in a simpler manner and so as to be less prone to wear, for example as a smooth face which can serve as a bearing face of the connection element. On account thereof, wear of the tool by repeated press-fitting procedures can be reduced or avoided, respectively. This can reduce the warping of the connection element by press-fitting. The durability of the press-fit connection between the strength supports and the connection element can be improved on account thereof.

Press-fitting is preferably performed in the direction of the height of the connection element, that is, perpendicularly to the transverse direction and to the longitudinal direction. Press-fitting of the ends of the strength supports to the connection element can be performed in that separate elements in the form of clamping bodies are press-fitted to the ends of the strength supports, and the elements can then be received by the connection element, for example so as to be held in a form-fitting manner.

In order for the tool region to be configured, one side of the connection element is preferably configured so as to be closed in a planar manner, and in the height has a depression of which the internal contour is configured as a tool contour. Press-fitting of the ends of the strength supports to the connection element or to the clamping bodies, respectively, can then be performed in this depression.

The external side of the connection element in the tool region is preferably configured so as to be closed and having a smooth face, such that the connection element can be placed in a flat manner on a smooth tool side, such as, for example, on a press ram of a press. This simplifies the construction of the press ram on this side and significantly reduces the wear at this point because faces between the workpiece and the tool which rub against one another in press-fitting can be avoided. Also, the production costs of the tool can be reduced on account thereof because a tool having a smooth face is significantly more simple to produce than a tool having a contour.

It is also advantageous herein that, by virtue of the material of the connection element that is closed in the longitudinal direction, tensile forces in the longitudinal direction can be transmitted across the entire area. This can help to reduce or avoid warping of the connection element in the case of stress. Also, the pressing forces in press-fitting can be better received by the connection element in this way, such that even warping of the connection element on account of press-fitting can be reduced or avoided.

According to one aspect of the present invention the tool region has a contour in a direction toward the ends of the strength supports, which contour can interact with the contour of a pressing tool in such a way that press-fitting of the ends of the strength supports in the connection element can be achieved. On account thereof, the contour of a tool side is transmitted to the connection element or is integrated in the latter, respectively, such that the effect of press-fitting on an object to be press-fitted remains the same but the advantages described above can be achieved.

According to one further aspect of the present invention the ends of the strength supports can be connected in a force-fitting manner to at least one clamping body in the connection element, wherein the clamping body can be supported during press-fitting from the one side in a direction by way of the tool region of the connection element and be press-fitted in the direction of a pressing tool from the opposite side.

According to one further aspect of the present invention the clamping body can be held in a form-fitting manner by the connection element at least in the longitudinal direction. This aspect of the present invention is thus based on the concept of achieving in this way a functional separation of the connection of the ends of the strength supports to the connection element. The clamped connection of the ends of the strength supports is thus performed in the clamping body which in relation to the connection element represents a separate body. The clamping body for its part is thus received by the connection element in such a manner that a form-fitting connection in the longitudinal direction can be established. In this way, a plastic deformation of the connection element on account of press-fitting which is required for establishing the force-fitting connection between the ends of the strength supports and the clamping body by press-fitting can be reduced or avoided, respectively. On account thereof, warping of the connection element that has arisen to date can be avoided or reduced, respectively. This can also reduce or even avoid the increased abrasion generated on account thereof between two connection elements rubbing against one another, and thus increase the service life of the belt or of the belt segment, respectively, or of the coupling of the belt or the belt segment, respectively. At the same time, the high durability of the force-fitting connection can be maintained.

It is furthermore advantageous that the materials of the clamping bodies and connection elements can now be conceived so as to be optimized for the respective purpose. To this end, dissimilar materials can be used, for example a steel having a good plastic deformation capability while at the same time having a high strength for the clamping body, and a hard or heat-treatable steel having a high wear resistance and tensile strength for the connection element. On account thereof, the deformation capability of the clamping body in press-fitting, and the stability of the connection element under tensile stress, can be in each case optimized.

The connection element is preferably configured in such a manner that the connection element can be completely integrated in the cross-section of the belt or of the belt segment, respectively. This is to be understood that the connection element neither in terms of height nor width protrudes beyond the contour of the belt or of the belt segment, respectively. In this way, any influence on the running behaviour of the belt that is closed in an endless manner can be avoided.

According to an aspect of the present invention the material of the clamping body is softer in relation to the material of the connection element. "Soft" herein is to be understood as a better free-flowing property or plastic deformation capability of the material of the clamping body in relation to the material of the connection element. For example, a stainless special steel such as, for example, V4A can be used as the material of the clamping body. A hard or heat-treatable steel can be employed as the material of the connection element, for example. The comparatively soft material of the clamping body facilitates positive press-fitting to the ends of the strength support, such as steel cables, for example. This can increase the clamping effect at an identical compression force, or can reduce the compression force required for establishing the force-fitting connection, respectively. The material of the connection element, on account of the comparatively high hardness thereof, can absorb high stresses and, on account thereof, counteract warping. In principle, wear by abrasion can likewise be reduced on account thereof.

It is also advantageous herein that the connection element can be produced by a casting or by a forged part, which can reduce the production costs. At the same time, the clamping body can be implemented by way of a small and geometrically simple body, which can likewise reduce the production costs.

According to a further aspect of the present invention at least two ends of the strength supports are connected in a force-fitting manner to a common clamping body, or in each case individually to one clamping body.

Connecting the ends of the strength supports to a common clamping body is advantageous because a larger clamping body can be produced, handled, and/or assembled in a simpler manner, which can reduce the production and assembly costs. All ends of the strength supports are preferably jammed in a common clamping body. This has the advantage that the jammed strength supports are collectively easier to handle.

Connecting the ends of the strength supports in each case individually to one clamping body is advantageous because smaller clamping bodies can be used on account thereof, which can reduce the diversity of variants. All ends of the strength supports are preferably in each case connected to one single clamping body. On account thereof, a standard clamping body can be repeatedly used even for belts or belt segments, respectively, having a different number of strength supports, which can reduce the production costs. In other words, the imperative for producing and providing different clamping bodies for different belts or belt segments, respectively, can be dispensed with.

According to a further aspect of the present invention the connection element has at least one clamping body receptacle which is configured at least in sections as a tool region, wherein at least one end of a strength support which is provided with a clamping body can be received and be held in a form-fitting manner at least in the longitudinal direction. On account of the clamping body receptacle within the dimensions of the connection element, a space where the clamping body can be received by the connection element in order to be held in a form-fitting manner can be achieved.

According to a further aspect of the present invention the clamping body receptacle is configured for receiving a clamping body to which the ends of a plurality of strength supports or to which the end of a strength support are or is connected in a force-fitting manner.

On account of a clamping body to which the ends of a plurality of strength supports are connected in a force-fitting manner, a space for receiving a clamping body of this type can be achieved by the connection element, such a space by virtue of the size thereof being able to be produced in a simpler and more rapid manner than a plurality of smaller clamping body receptacles.

On account of a clamping body to which the end of a strength support is connected in a force-fitting manner, a space for receiving a clamping body of this type is achieved by the connection element, that is, for very small clamping bodies which in each case can therein receive only one single end of a strength support.

According to a further aspect of the present invention the connection element has at least two clamping body receptacles in which in each case at least one end of a strength support which is provided with a clamping body can be received and can be held in a form-fitting manner at least in the longitudinal direction, wherein the two clamping body receptacles are separated from one another in the transverse direction by way of a web which runs in the longitudinal direction. The transmission of tensile forces in the longitudinal direction can be improved in this way, because the tensile forces can be transmitted not only by way of the lateral edges of the connection element but also directly by way of the webs between the clamping body receptacles. The deformation of the connection element can be reduced on account thereof.

According to a further aspect of the present invention the connection element has at least one strength support leadthrough, preferably in the form of a bore and/or in the form of a groove, through which at least one strength support can be passed in the longitudinal direction into a clamping body receptacle. The region of the connection element through which a strength support can exit through the strength support leadthrough into the clamping body receptacle forms the detent of the clamping body for the form-fitting retention of the connection element.

The strength support leadthrough is preferably configured as a bore through the connection element. In this way, the strength support leadthrough can be surrounded all around by the material of the connection element such that the forces of the form-fit can be transmitted in a uniform manner. A higher stability can be generated on account thereof. It is necessary herein that the ends of the strength supports are plug-fitted through the bores into the clamping body receptacle where the ends are introduced into respective receptacles of the clamping body and can then be press-fitted therein.

The strength support leadthrough is preferably configured as a groove through the connection element. In other words, the material of the connection element in terms of the height is interrupted such that the ends of the strength supports that are provided with the clamping body can be placed into the grooves from one side. The clamping body herein is simultaneously placed into the clamping body receptacle. In this way, press-fitting can be performed independently of the connection element prior to this step.

According to a further aspect of the present invention the belt or the belt segment furthermore has a cover which can close the groove and/or the clamping body receptacle perpendicularly to the longitudinal direction. In this way, the strength supports that are introduced into the grooves, or the clamping body that is received in the clamping body receptacle, respectively, can be protected there by the cover. Furthermore, the friction values of the articulation in relation to the surface of the belt and the visual appearance of the belt can be influenced on account of the cover.

According to a further aspect of the present invention the strength support leadthrough is of a widened configuration in the longitudinal direction, in the direction that is opposite to the ends of the strength supports. In this way, buckling of the strength supports can be avoided in particular in the case of the belt being bent, for example on a drum. In other words, it can be achieved that the strength supports can always run in the neutral phase. This avoids damage to the strength supports and increases the service life of the strength supports, or the service life of the belt, respectively.

The widening of the strength support leadthrough is preferably configured so as to be conical. The advantages described above can be implemented in a simple manner on account thereof. This likewise applies to a hyperbolic shape of the widening.

According to a further aspect of the present invention the belt or the belt segment, respectively, has an elastomeric main body in which the strength supports are embedded, wherein the ends of the strength supports are exposed by the material of the elastomeric main body. The material of the elastomeric main body is preferably a vulcanized rubber. An elastic belt, or an elastic belt segment, respectively, can be achieved in this way. An exposure of the ends of the strength supports herein is to be understood as an external exposure by the elastomeric material of the main body such that the ends of the strength supports such as, for example, steel cables, externally appear to be bright and by virtue of the minor cross-section of the steel cables can be introduced into the clamping body receptacles of the clamping body and be press-fitted therein.

According to a further aspect of the present invention, the connection element on the belt inner side thereof has a semicircular concavity. This concavity is configured in the manner of a half-shell and in terms of the radius thereof corresponds to the radius of, for example, a drum on which the belt or the coupling region of the latter, respectively, can be deflected. This concavity facilitates rolling on the drums and can help to avoid buckling of the strength supports, such that the strength supports can at all times remain in the neutral phase even when rolling. Any buckling of the strength supports can be avoided on account thereof, and the service life of the strength supports, or the service life of the belt, respectively, can be increased.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
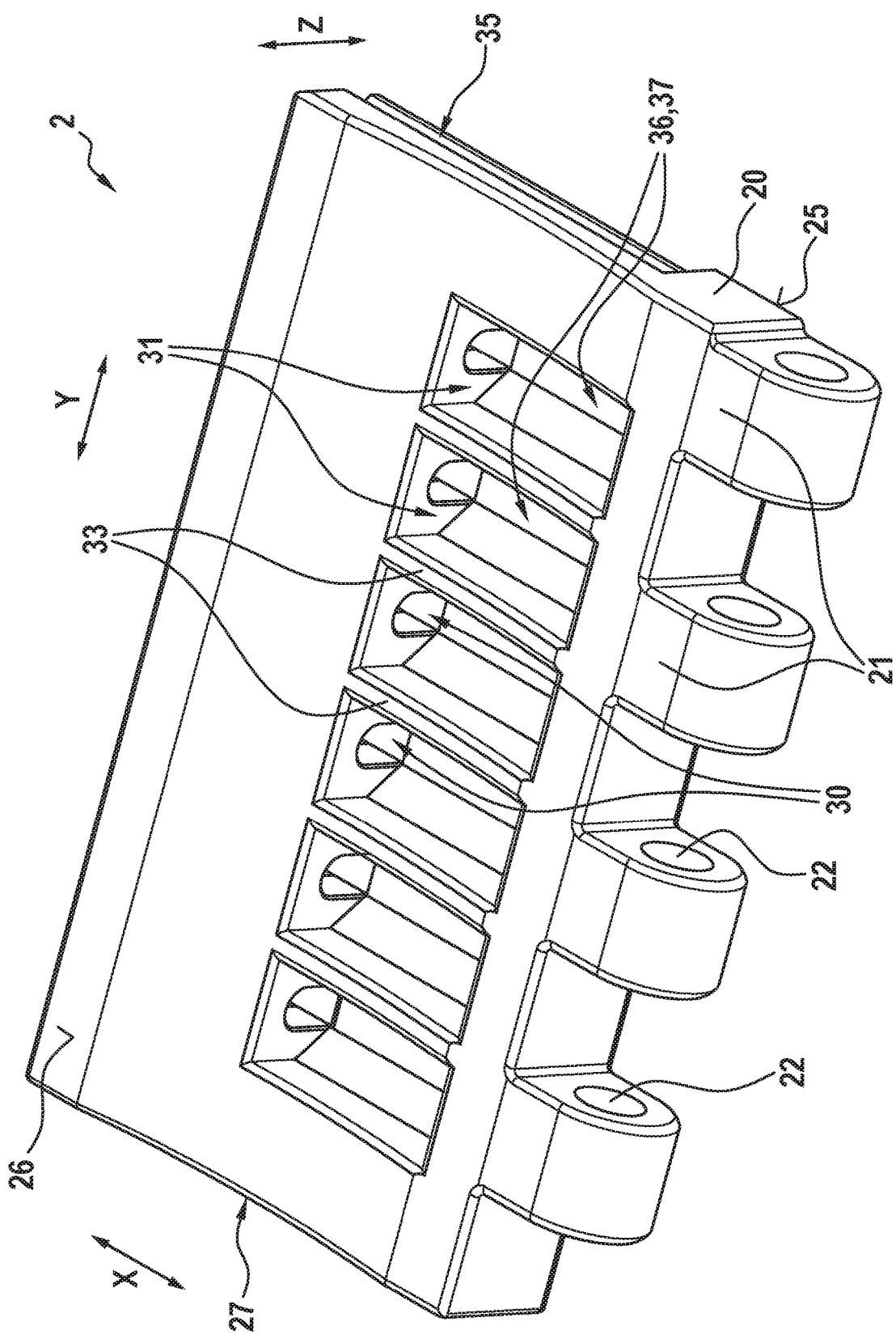
FIG. 1 shows a perspective schematic illustration of a connection element according to an embodiment the invention from below.
Figure 2:
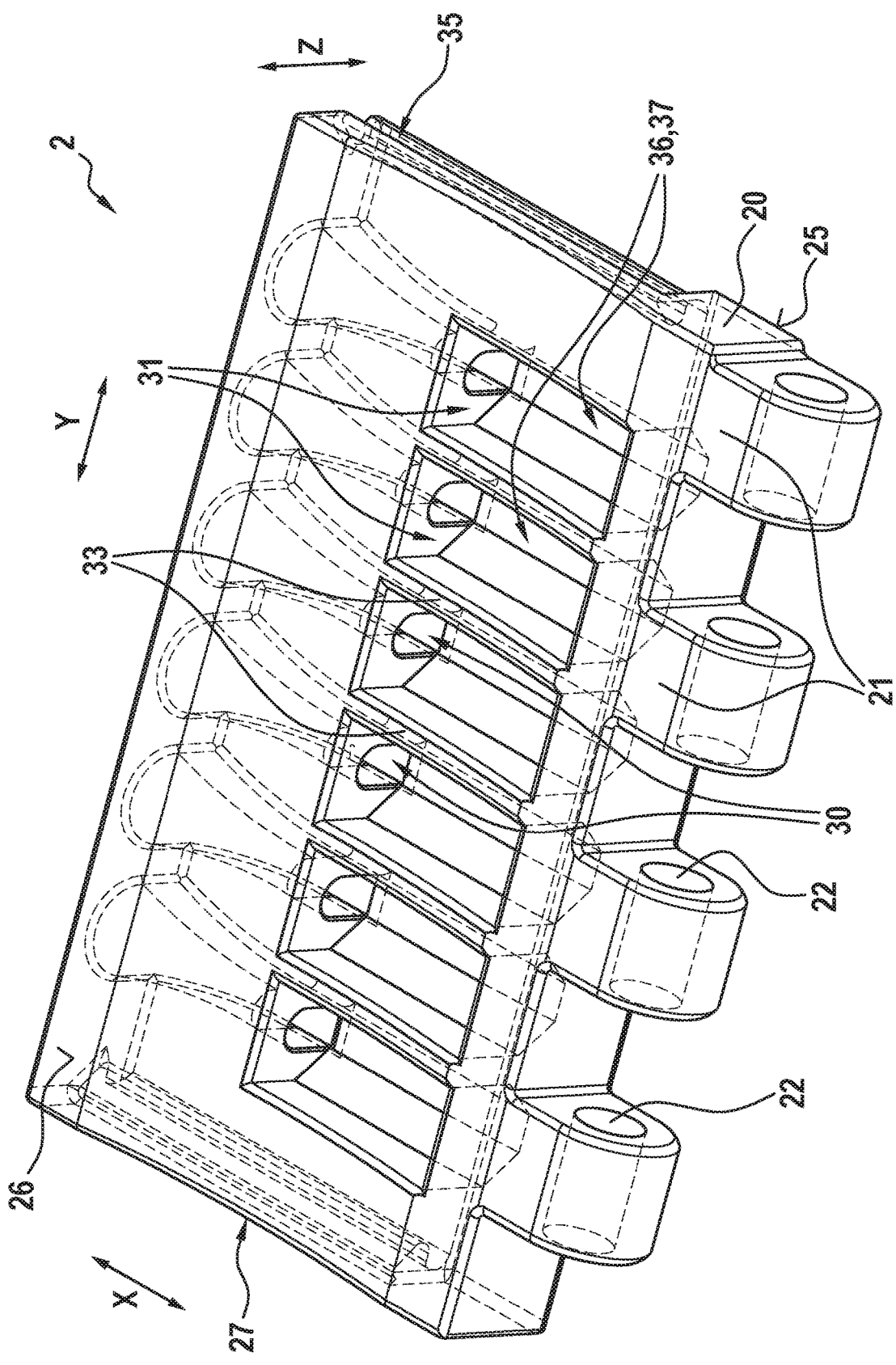
FIG. 2 shows a transparent illustration of FIG. 1.
Figure 3:
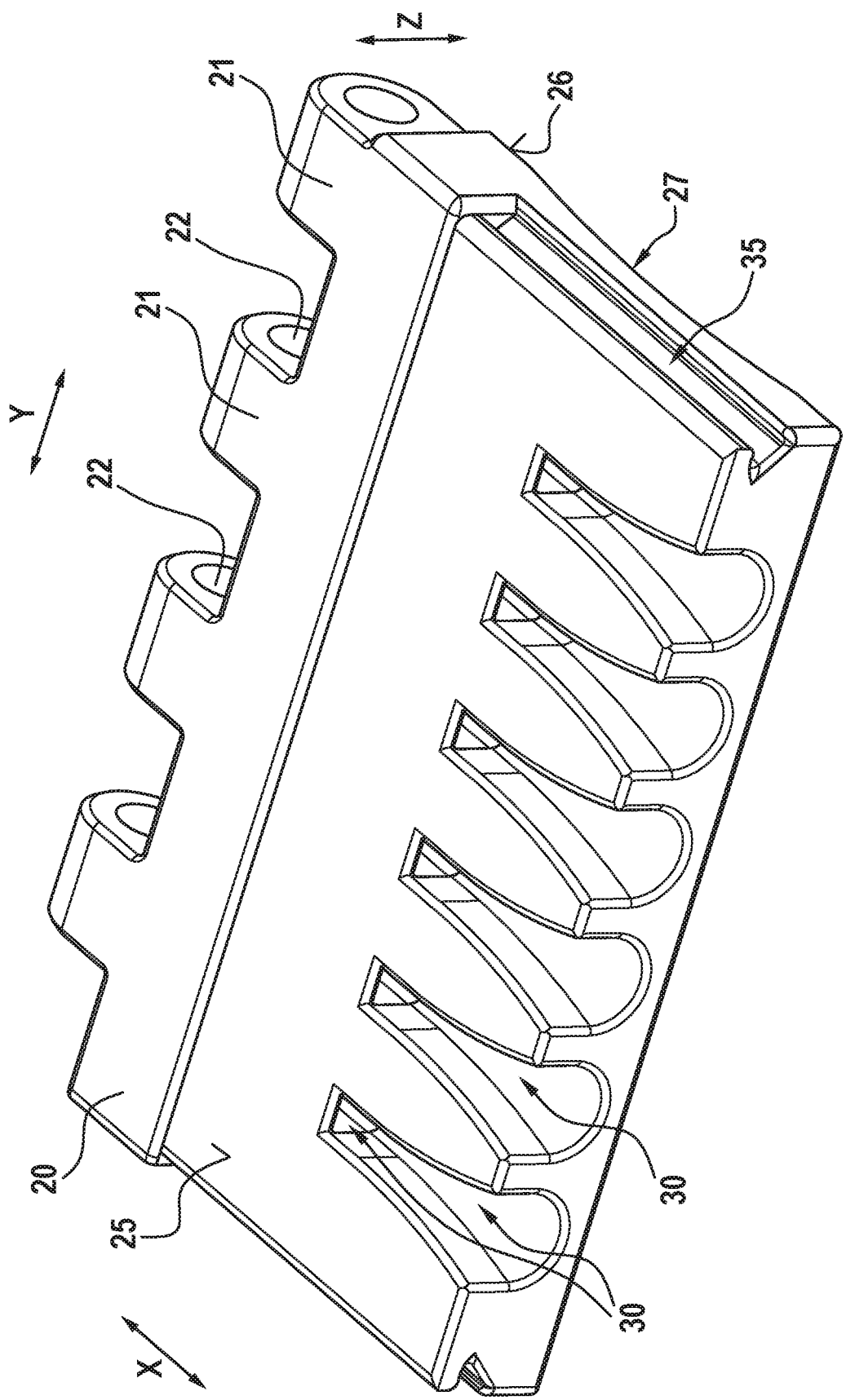
FIG. 3 shows a perspective schematic illustration of the connection element according to an embodiment of the invention from above.
Figure 4:
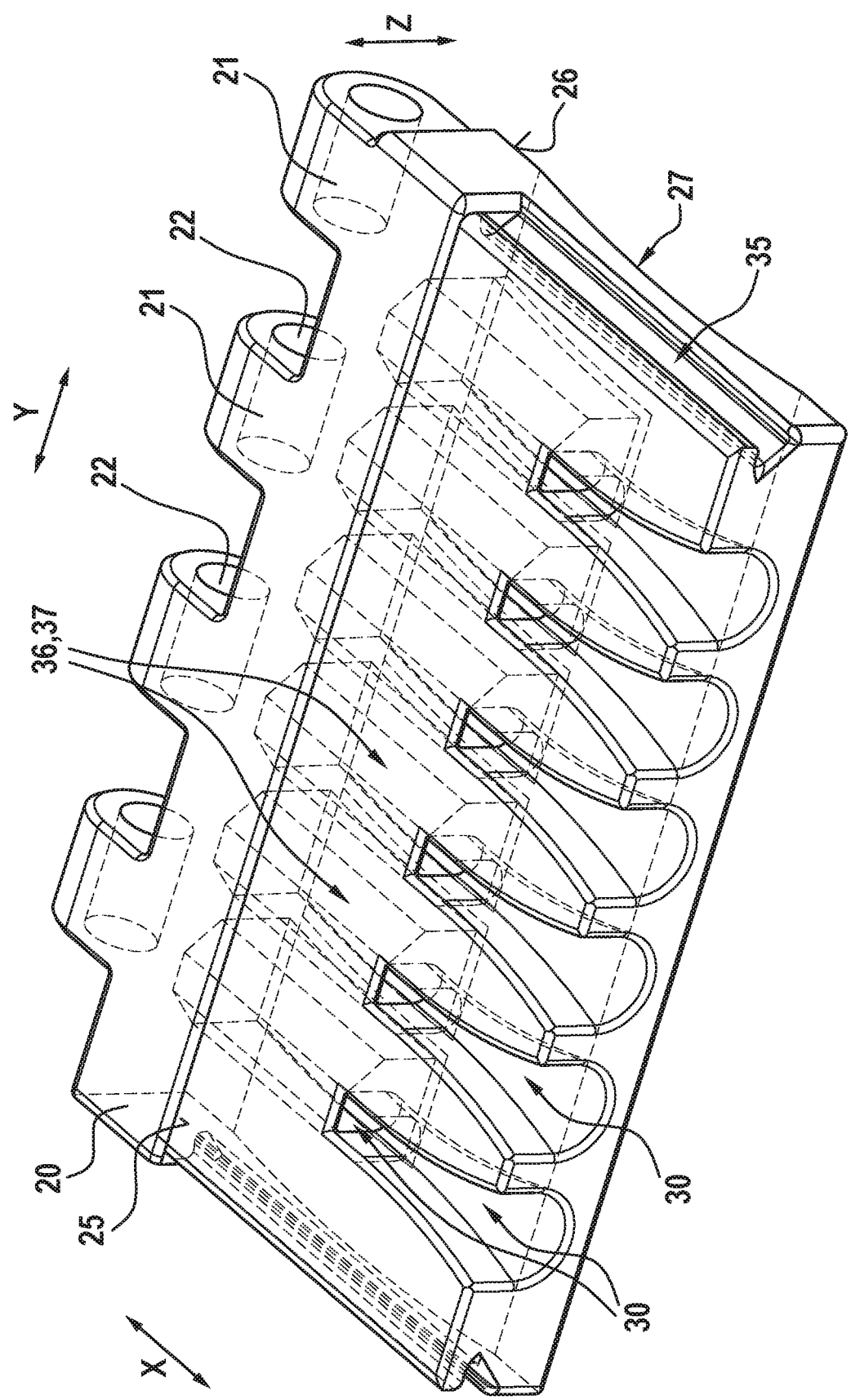
FIG. 4 shows a transparent illustration of FIG. 3.

FIG. 1 shows a perspective schematic illustration of a connection element 2 according to an embodiment of the invention from below. FIG. 2 shows a transparent illustration of FIG. 1. FIG. 3 shows a perspective schematic illustration of the connection element 2 according to an embodiment of the invention from above. FIG. 4 shows a transparent illustration of FIG. 3.

Figure 5:
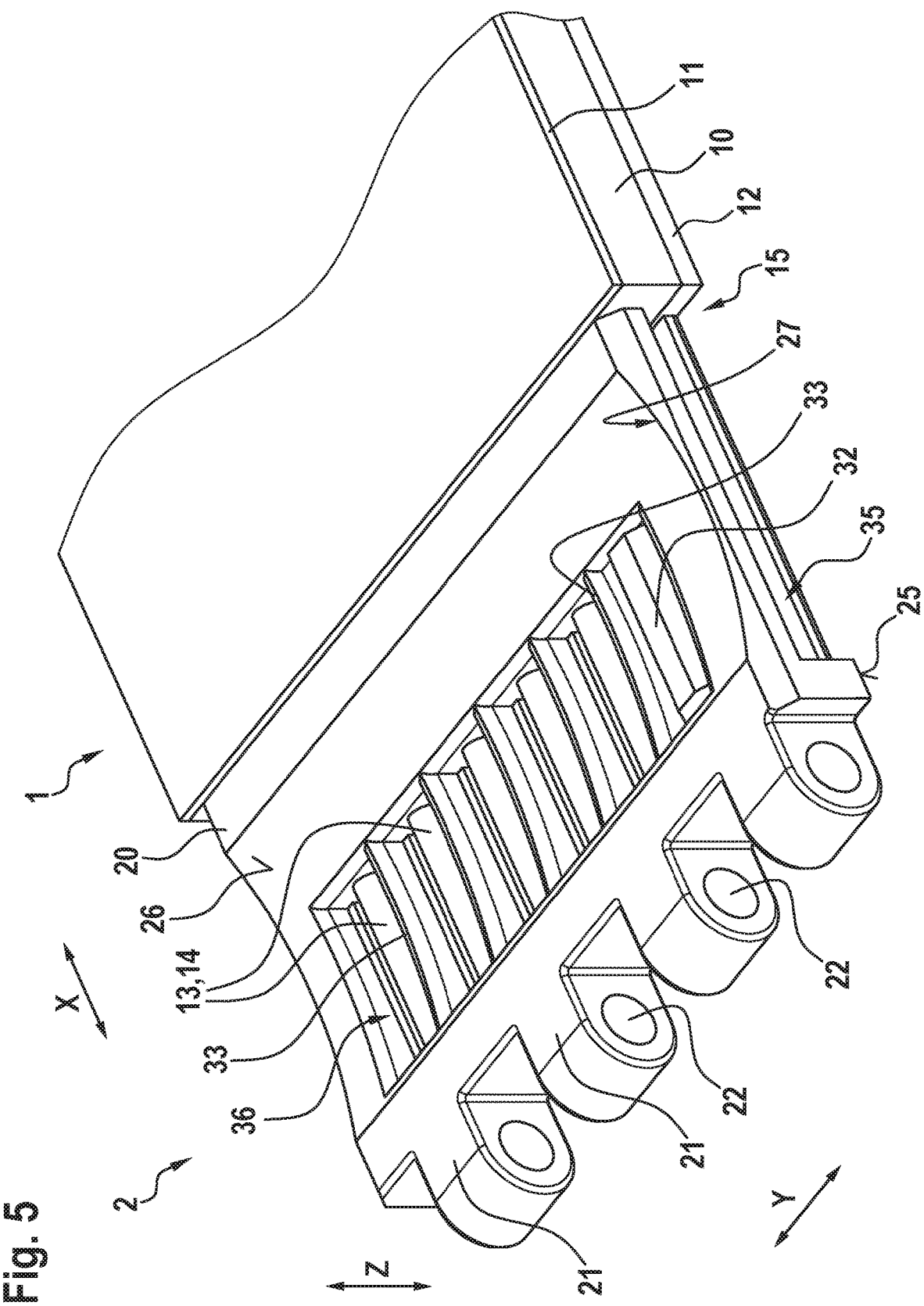
FIG. 5 shows a perspective schematic illustration of a belt end having a connection element according to an embodiment of the invention from below.
Figure 6:
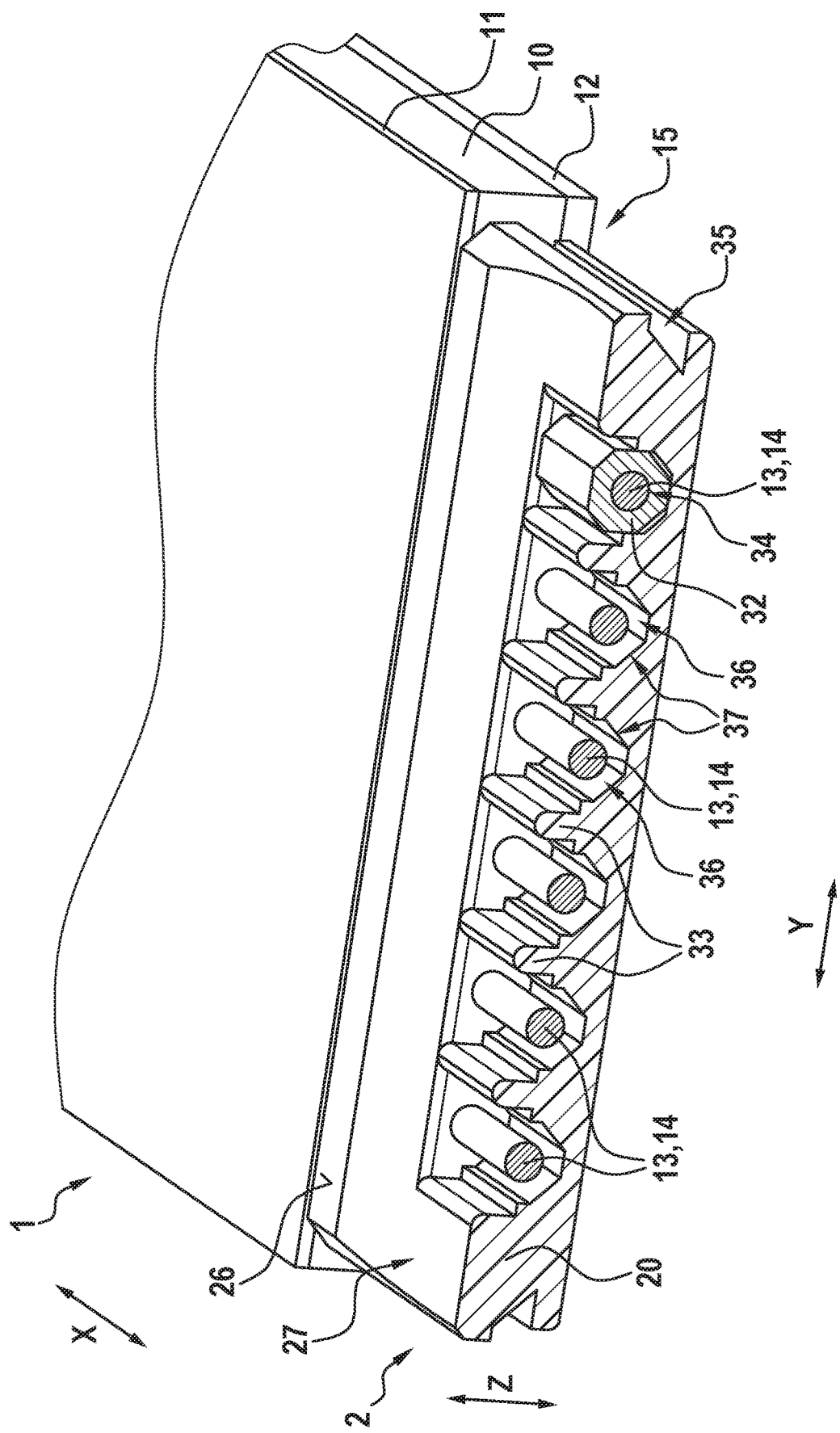
FIG. 6 shows a cross section of the illustration of FIG. 5.
Figure 7:
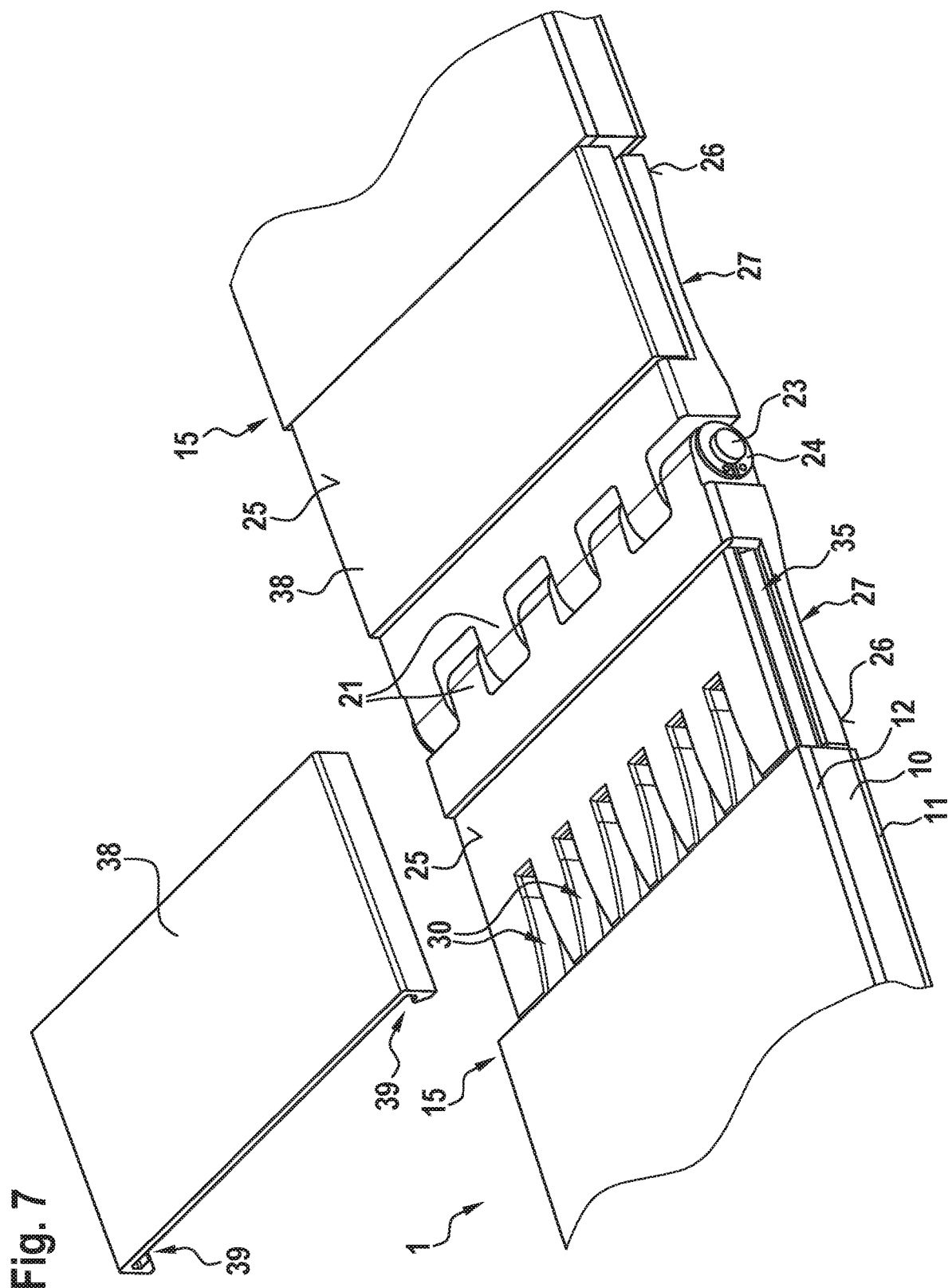
FIG. 7 shows a belt having the connection elements according to an embodiment of the invention from above; and, FIG. 8 shows a cross-section through a machine tool for making a press-fit connection in a connection element according to the invention.

The connection element 2 has a longitudinal direction X. A transverse direction Y which can also be referred to as the width Y extends perpendicularly to the longitudinal direction X. A height Z which can also be referred to as the thickness Z extends perpendicularly in each case to the longitudinal direction X and the transverse direction Y. These directional indications in terms of the Cartesian coordinate system apply in an analogous manner to a belt end 15 which is illustrated in FIGS. 5 and 6, to a belt 1 which is illustrated in FIG. 7, and to a machine tool 4 according to FIG. 8.

The connection element 2 has a main body 20 which is composed of a hard or heat-treatable steel. The main body 20 on the one edge thereof in the longitudinal direction X has a plurality of castellated projections 21 which in each case have transverse bores 22 that run in the transverse direction Y. The main body 20 has a belt outer side 25 which forms the upper side 25 of the main body 20. The main body 20 furthermore has a belt inner side 26 which forms the lower side 26 of the main body 20. The lower side 26 of the belt body 20 has a concavity 27 which is configured so as to be semicircular and in terms of the radius thereof corresponds to the external radius of a drum, for example, about which the belt 1 can revolve (cf. FIGS. 5 and 6). In the transverse direction Y the lateral edges of the connection element 2 have in each case one latching receptacle 35 for the latching of latching hooks 39 of a cover 38 which in a U-shaped manner can cover the upper side 25 of the main body 20 (cf. FIG. 7).

The connection element 2 furthermore has a plurality of clamping body receptacles 31 which are configured as rectangular recesses within the main body 20 and are subdivided into individual clamping body receptacles 31 by a plurality of webs 33 that are configured in the longitudinal direction X. The webs 33 can transmit forces in the longitudinal direction X and, on account thereof, can counteract any warping of the connection element 2 by virtue of stresses in the longitudinal direction X.

The clamping body receptacles 31 are configured so as to be closed toward the upper side 25 (cf. FIGS. 3 and 4) and open toward the lower side 26 (cf. FIGS. 1 and 2). The clamping body receptacles 31 on the internal side thereof in the height Z are in each case configured as tool regions 36 and have in each case one contour 37 which corresponds to a tool side. A plurality of strength support leadthroughs 30 in the form of bores 30 extend from the clamping body receptacles 31 in the longitudinal direction X, in the direction that is opposite to the castellated projections 21, through the main body 20 and there become grooves 30 which are configured so as to be open toward the lower side 26. The grooves 30 are configured so as to widen toward the belt 1.

FIG. 5 shows a perspective schematic illustration of a belt end 15 having a connection element 2 according to an embodiment of the invention from below. FIG. 6 shows a cross-section of the illustration of FIG. 5. FIG. 7 shows a belt 1 having connection elements 2 according to an embodiment of the invention from above.

Correspondingly formed clamping bodies 32 are disposed in each case in the clamping body receptacles 31, wherein in each case only one clamping body 32 is illustrated in the illustrations of FIGS. 5 and 6. The ends 14 of strength supports 13 in the form of steel cables 13 are press-fitted by press-fitting in each case in one strength support receptacle 34 of a clamping body 32 within the clamping body 32, wherein the ends 14 of the steel cables 13 by virtue of the plurality of not-illustrated clamping bodies 32 are visible in the illustrations of FIGS. 5 and 6. To this end, the steel cable 13 at the ends 14 thereof are exposed by the material of an elastomeric main body 10 of the belt 1. The elastomeric main body 10 in the height Z has a lower elastomeric cover layer 11 and an upper elastomeric cover layer 12. The exposed ends 14 of the steel wires 13, together with the clamping bodies 32 and the connection element 2, collectively form the belt end 15.

The two connection elements 2 of two belt ends 15 of the same belt 1, or of two belt segments 1, can be interconnected in an articulated manner by means of a coupling bar 23 through the transverse bores 22 of the connection elements 2 (FIG. 7). The coupling bar 23n in this position can be secured in the transverse direction Y on both sides by coupling bar securing elements 24.

According to an aspect of the invention, the lower internal sides of the clamping body receptacles 31 have in each case a contour 37 which corresponds to the contour of a tool side which is suitable for press-fitting the clamping bodies 32 to the ends 14 of the strength supports 13. By virtue of this contour 37, the lower internal sides of the clamping body receptacles 31 form in each case one tool region 36 which therefore no longer has to be provided by a tool lower part 40 of a machine tool 4 (cf. FIG. 8). The connection element 2 in the longitudinal direction X and the transverse direction Y can thus be configured so as to be closed in a planar manner, that is, without recesses through which a tool lower part 40 would have to engage through the connection element 2 in order for the clamping bodies 32 to be press-fitted. In particular in relation to the tensile forces that act in the longitudinal direction X when the belt 1 is in use, this can increase the stability of the connection element 2. On account thereof, wear of the tool lower part 40 can also be avoided.

Figure 8:
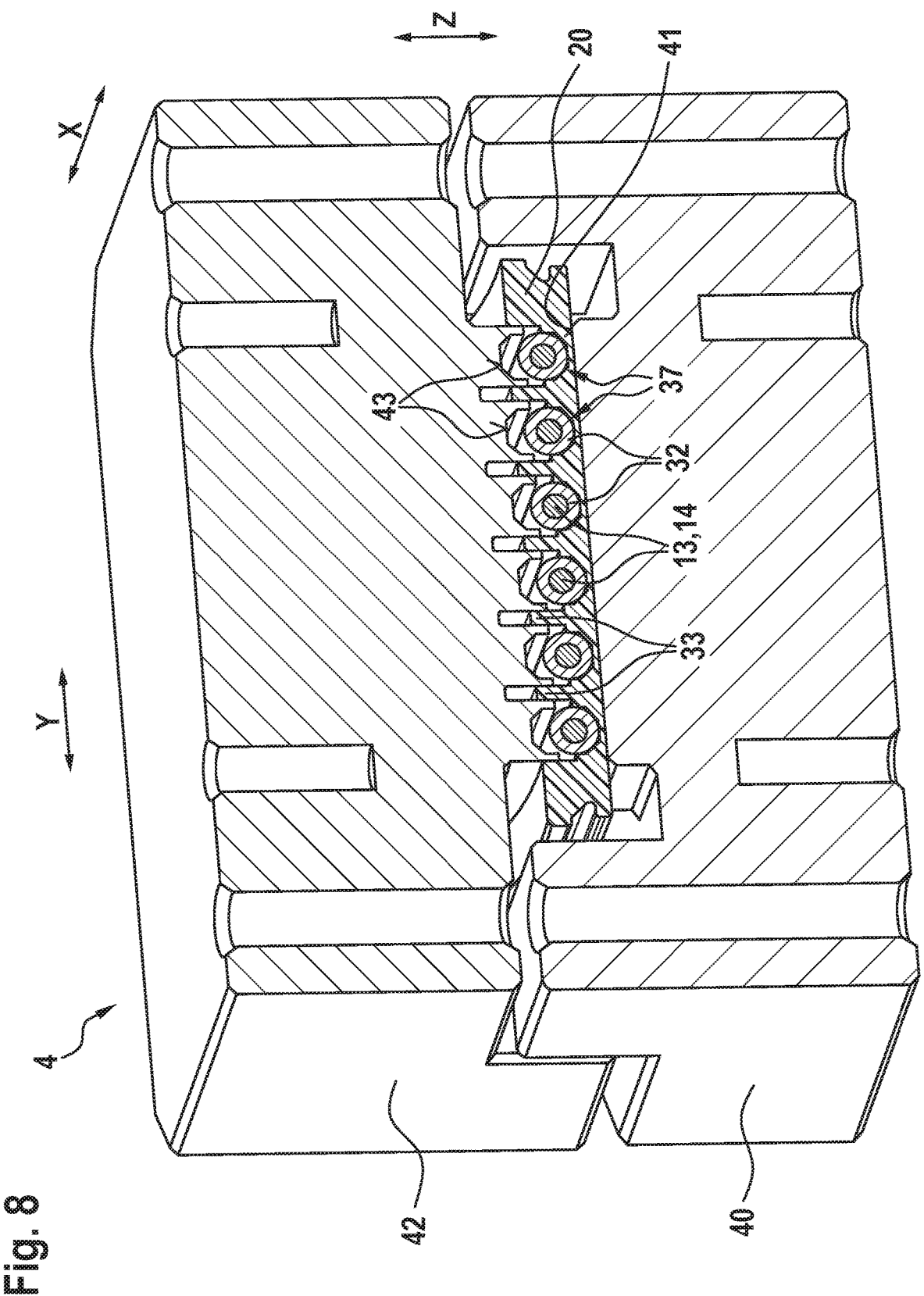

FIG. 8 shows a cross-section through a machine tool 4 for producing a press-fit connection in a connection element 2 according to an aspect of the invention. The machine tool 4 represents a press 4 and has a tool lower part 40 which forms a press ram 40, and a tool upper part 42 which forms a pressing tool 42. The press ram 40 has a bearing face 41 onto which the connection element 2 by way of the lower side 26 thereof is placed in a flat manner. The contour 43 of the pressing tool 42 is configured so as to correspond to the contour 37 of the tool region 36 of the connection element 2 and is aligned toward the connection element 2.

In order for the ends 14 of the strength supports 13 to be press-fitted, the ends 14 by way of the grooves 30 or bores 30, respectively, are introduced into the strength support receptacles 34 of the clamping bodies 32 which to this end are first disposed in the clamping body receptacles 31 of the connection element 2. The connection element 2 in this form is then placed into the press 4, onto the bearing face 41 of the press ram 40, and in relation to the contour 43 of the press-fitting tool 42 is positioned in such a manner that the press-fitting tool 42 in the height Z can be driven from above into the clamping body receptacles 31. The press-fitting tool 42 herein presses the clamping bodies 32 against the contours 37 of the tool regions 36 of one of each of the clamping body receptacles 31 which in turn in the height Z are supported from below by the bearing face 41 of the press ram 40. The material of the clamping bodies 32 that in relation to the material of the connection element 2 is softer, is plastically deformed on account thereof, and thus forms a force-fitting connection to the ends 14 of the strength supports 13. The clamping body 32 that are press-fitted in a force-fitting manner in turn are held in a form-fitting manner in the longitudinal direction X within the clamping body receptacles 31, such that the strength supports 13 can transmit tensile forces in the longitudinal direction X.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)

X Longitudinal direction of the belt 1 or of the belt segment 1, respectively
Y Transverse direction, or width, respectively, of the belt 1 or of the belt segment 1, respectively
Z Height or thickness, respectively, of the belt 1 or of the belt segment 1, respectively
1 Belt or belt segment, respectively
10 Elastomeric main body
11 Lower elastomeric cover layer
12 Upper elastomeric cover layer
13 Strength supports or steel cables, respectively
14 End of the strength supports 13
15 Belt end or belt segment end, respectively
2 Connection elements
20 Main body
21 Castellated projections
22 Transverse bores of the castellated projections
23 Coupling bar
24 Coupling bar securing element
25 Belt outer side or upper side, respectively, of the main body 20
26 Belt inner side or lower side, respectively, of the main body 20
27 Concavity of the lower side 26
30 Strength support leadthrough of the main body 20, bore or groove, respectively
31 Clamping body receptacles
32 Clamping body
33 Webs of the main body 20 in the longitudinal direction X
34 Strength support receptacles of the clamping bodies 32
35 Latching receptacle for the cover
36 Tool region or part-region, respectively, of the connection element 2
37 Contour of the tool region 36
38 Cover
39 Latching hook of the cover 38
4 Machine tool, press
40 Tool lower part, press ram
41 Bearing face of the tool lower part 40

42 Tool upper part, pressing tool
43 Contour of the tool upper part 42

What is claimed is:

1. A belt or belt segment comprising:

a plurality of strength supports each having a strength support end;

the belt or belt segment defining, a first belt end, a second belt end, and a longitudinal direction (X);

said plurality of strength supports running in the longitudinal direction (X) and being arranged so as to be mutually parallel;

a connection element which forms said first belt end of the belt or of the belt segment and is configured for connecting to a further connection element of said second belt end or to an end of a further belt segment;

said connection element being configured to hold said strength support ends of the strength supports in a force-fitting manner by way of press-fitting; and, said connection element including a part-region configured as a tool region so as to serve as a tool part during a press-fitting of said strength support ends of said strength supports in said connection element.

2. The belt or belt segment of claim 1, wherein:

said tool region has a contour in a direction (Z) toward said strength support ends of said strength supports; and, said contour is configured to interact with a contour of a pressing tool in such a way that press-fitting of said strength support ends of said strength supports in said connection element can be achieved.

3. The belt or belt segment of claim 1 further comprising:

at least one clamping body;

said strength support ends of said strength supports being configured to be connected in a force-fitting manner to said at least one clamping body in the connection element; and, said at least one clamping body being configured to be supported during press-fitting from the one side in a direction (Z) by way of said tool region of said connection element and to be press-fitted in the direction (Z) by a pressing tool from the opposite side.

4. The belt or belt segment of claim 3, wherein said at least one clamping body is configured to be held in a form-fitting manner by said connection element at least in the longitudinal direction (X).

5. The belt or belt segment of claim 3, wherein:

said at least one clamping body includes a first material;

said connection element includes a second material; and, said first material is softer than said second material.

6. The belt or belt segment of claim 3, wherein:

said at least one clamping body is a common clamping body; and, at least two of said strength support ends are connected in a force-fitting manner to said common clamping body.

7. The belt or belt segment of claim 3, wherein:

the belt or belt segment includes a plurality of clamping bodies; and, at least two of said strength support ends are each individually connected in a force-fitting manner to a corresponding one of said plurality of clamping bodies.

8. The belt or belt segment of claim 3, wherein:

said connection element has at least one clamping body receptacle which is configured at least in sections as said tool region; and, at least one of said strength support ends is provided with a clamping body configured to be received in said clamping body receptacle and to be held in a form-fitting manner at least in the longitudinal direction (X).

9. The belt or belt segment of claim 8, wherein:

said clamping body receptacle is configured to receive said clamping body; and, at least one of said strength support ends is connected in a force-fitting manner to said clamping body.

10. The belt or belt segment of claim 7 further comprising:

a web running in the longitudinal direction (X);

said connection element having at least two clamping body receptacles;

said at least two clamping body receptacles each being configured to receive and hold, in a form-fitting manner at least in the longitudinal direction (X), at least one of said strength support ends provided with one of said plurality of clamping bodies; and, said at least two clamping body receptacles being separated from one another in a transverse direction (Y) by way of said web.

11. The belt or belt segment of claim 7, wherein:

said connection element has at least one clamping body receptacle; and, said connection element defines at least one strength support leadthrough configured to have at least one strength support pass therethrough in the longitudinal direction (X) into said at least one clamping body receptacle.

12. The belt or belt segment of claim 11, wherein said leadthrough is in the form of at least one of a bore and a groove.

13. The belt or belt segment of claim 12 further comprising a cover configured to close at least one of said groove and said clamping body receptacle perpendicularly to said longitudinal direction (X).

14. The belt or belt segment of claim 11, wherein said strength support leadthrough is of a widened configuration in the longitudinal direction (X), in the direction that is opposite to said strength support ends.

15. The belt or belt segment of claim 1 further comprising:

an elastomeric main body and having said strength supports embedded therein; and, said strength support ends being exposed by the material of the elastomeric main body.

16. The belt or belt segment of claim 1, wherein:

said connection element has a belt inner side; and, said connection element on said belt inner side defines a semicircular concavity.

* * * * *